(12) United States Patent
Fink et al.

(10) Patent No.: US 10,025,992 B1
(45) Date of Patent: *Jul. 17, 2018

(54) BULK SEARCHABLE GEO-TAGGING OF DETECTED OBJECTS IN VIDEO

(71) Applicant: Ambarella, Inc., Santa Clara, CA (US)

(72) Inventors: Alexander Fink, San Jose, CA (US); Shimon Pertsel, Mountain View, CA (US)

(73) Assignee: Ambarella, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/695,237

(22) Filed: Sep. 5, 2017

Related U.S. Application Data

(63) Continuation of application No. 14/792,824, filed on Jul. 7, 2015, now Pat. No. 9,779,309.

(51) Int. Cl.
*G06K 9/46* (2006.01)
*G06K 9/00* (2006.01)
*G06F 17/30* (2006.01)
*G06K 9/62* (2006.01)

(52) U.S. Cl.
CPC ... *G06K 9/00771* (2013.01); *G06F 17/30268* (2013.01); *G06K 9/00268* (2013.01); *G06K 9/46* (2013.01); *G06K 9/6201* (2013.01)

(58) Field of Classification Search
CPC .................................................. G06K 9/00771
See application file for complete search history.

(56) References Cited

U.S. PATENT DOCUMENTS

| | | | | |
|---|---|---|---|---|
| 9,779,309 | B1* | 10/2017 | Fink | G06K 9/00771 |
| 2012/0226752 | A1* | 9/2012 | Jeong | H04W 4/206 |
| | | | | 709/204 |
| 2013/0018582 | A1* | 1/2013 | Miller | G01C 17/38 |
| | | | | 701/501 |
| 2013/0279757 | A1* | 10/2013 | Kephart | G06K 9/00771 |
| | | | | 382/105 |
| 2014/0036087 | A1* | 2/2014 | Furue | G11B 27/034 |
| | | | | 348/157 |
| 2014/0169633 | A1* | 6/2014 | Seyfried | G06K 9/00791 |
| | | | | 382/105 |
| 2016/0162243 | A1* | 6/2016 | Neisler | G09G 5/08 |
| | | | | 345/163 |

* cited by examiner

*Primary Examiner* — Eileen M Adams

(74) *Attorney, Agent, or Firm* — Christopher P. Maiorana, PC

(57) ABSTRACT

An apparatus comprising a sensor, an interface and a processor. The sensor may be configured to generate a video signal based on a targeted view of an environment. The interface may be configured to receive status information of the apparatus at a time of generation of the video signal. The processor may be configured to (i) detect one or more objects in the video signal, (ii) determine a location of the one or more objects relative to the sensor and (iii) generate metadata. The location of the one or more objects may be based on (i) the status information of the apparatus and (ii) a field of view of the sensor. The metadata may correspond to the location of the one or more objects.

20 Claims, 9 Drawing Sheets

BULK SEARCHABLE GEO-TAGGING OF DETECTED OBJECTS IN VIDEO

This application relates to U.S. Ser. No. 14/792,824, filed Jul. 7, 2015, which is incorporated by reference in its entirety.

FIELD OF THE INVENTION

The present invention relates to video capture devices generally and, more particularly, to bulk searchable geo-tagging of detected objects in video.

BACKGROUND OF THE INVENTION

The use of video surveillance and video recordings is expanding. Police departments are deploying dash cameras, wearable cameras and IP camera systems with broad coverage across many cities in the world. Information from cameras is currently stored primarily in video form. In the case of an incident, data in video form is very difficult to search through.

Furthermore, consumers are recording, storing and uploading video data. Smartphones provide quick access to recording devices and access to the internet (i.e., YouTube, Facebook) provides an easy resource for storing and sharing a large number of videos. As more videos are stored and archived, the ability to search for specific videos becomes more difficult.

In some cases video footage is geo-tagged based on Global Positioning System (GPS) coordinates of the capturing camera. Video footage can be analyzed for faces and license plates that are stored in a system. However, GPS coordinates correspond to the capturing camera and do not provide an exact location and timestamp of the faces or license plates identified in the video.

It would be desirable to implement bulk searchable geo-tagging for detected objects in video and log such metadata into a searchable database.

SUMMARY OF THE INVENTION

The present invention concerns an apparatus comprising a sensor, an interface and a processor. The sensor may be configured to generate a video signal based on a targeted view of an environment. The interface may be configured to receive status information of the apparatus at a time of generation of the video signal. The processor may be configured to (i) detect one or more objects in the video signal, (ii) determine a location of the one or more objects relative to the sensor and (iii) generate metadata. The location of the one or more objects may be based on (i) the status information of the apparatus and (ii) a field of view of the sensor. The metadata may correspond to the location of the one or more objects.

The objects, features and advantages of the present invention include providing bulk searchable geo-tagging of detected objects in video that may (i) analyze video in real-time, (ii) detect objects such as vehicles, license plates and/or faces, (iii) estimate a distance to an object, (iv) determine a relative location and/or orientation of an object in a video frame, (v) determine absolute coordinates of an object based on a field of view of a camera, (vi) append metadata to a video file (vii) send alerts and/or notifications based on matches to information stored in a database and/or (viii) be easy to implement.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

Figure 1:
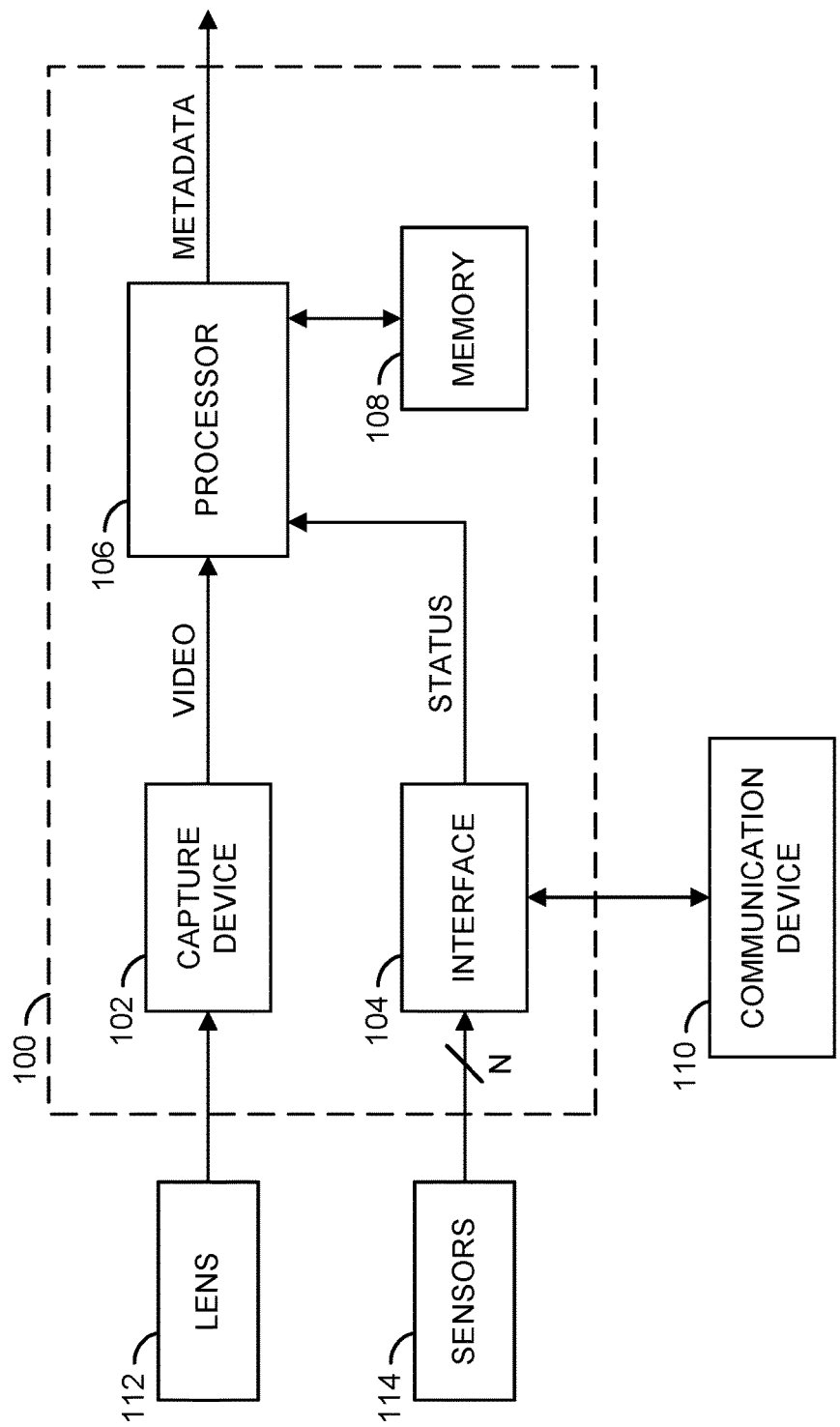
FIG. 1 is a block diagram of an example embodiment of an apparatus.

Referring to FIG. 1, a block diagram of an apparatus 100 is shown in accordance with an embodiment of the present invention. The apparatus 100 may be a camera system. The camera system 100 may comprise a block (or circuit) 102, a block (or circuit) 104, a block (or circuit) 106 and/or a block (or circuit) 108. The circuit 102 may implement a capture device. The circuit 104 may implement an interface. The circuit 106 may be configured as a processor. The circuit 108 may be configured as a memory.

The camera system 100 is shown connected to a block (or circuit) 110 and/or a block (or circuit) 114. The circuit 110 may be an external communication device. The circuit 114 may be implemented as one or more sensors (e.g., a location module such as a GPS sensor and/or an orientation module such as a magnetometer). Generally, the sensors 114 may be input/output devices separate from the capture device 102. In some embodiments, the communication device 110 and/or the sensors 114 may be implemented as part of the camera system 100 (e.g., internal components of the camera system 100).

The camera system 100 is shown receiving input from a block (or circuit) 112. The block 112 may be a lens (e.g., a camera lens). In some embodiments, the lens 112 may be implemented as part of the camera system 100. The components implemented in the camera system 100 may be varied according to the design criteria of a particular implementation. In some embodiments, the camera system 100 may be implemented as a drop-in solution (e.g., installed as one component).

The capture device 102 may present a signal (e.g., VIDEO) to the processor 106. The interface 104 may present a signal (e.g., STATUS) to the processor 106. The interface 104 is shown receiving data from the sensors 114. The processor 106 may be configured to receive the signal VIDEO, the signal STATUS and/or other signals. The processor 106 may be configured to generate a signal (e.g., METADATA). The inputs, outputs and/or arrangement of the components of the camera system 100 may be varied according to the design criteria of a particular implementation.

The camera system 100 may be implemented as a regular digital camera and/or a depth-sensing camera. The sensors 114 may comprise a GPS and/or a magnetometer. The sensors 114 may be implemented on-board the camera system 100 and/or connected externally (e.g., via the interface 104). The processor 106 may analyze the captured video content (e.g., the signal VIDEO) in real time to detect objects 202a-202n (to be described in more detail in association with FIGS. 3-4).

Figure 2:
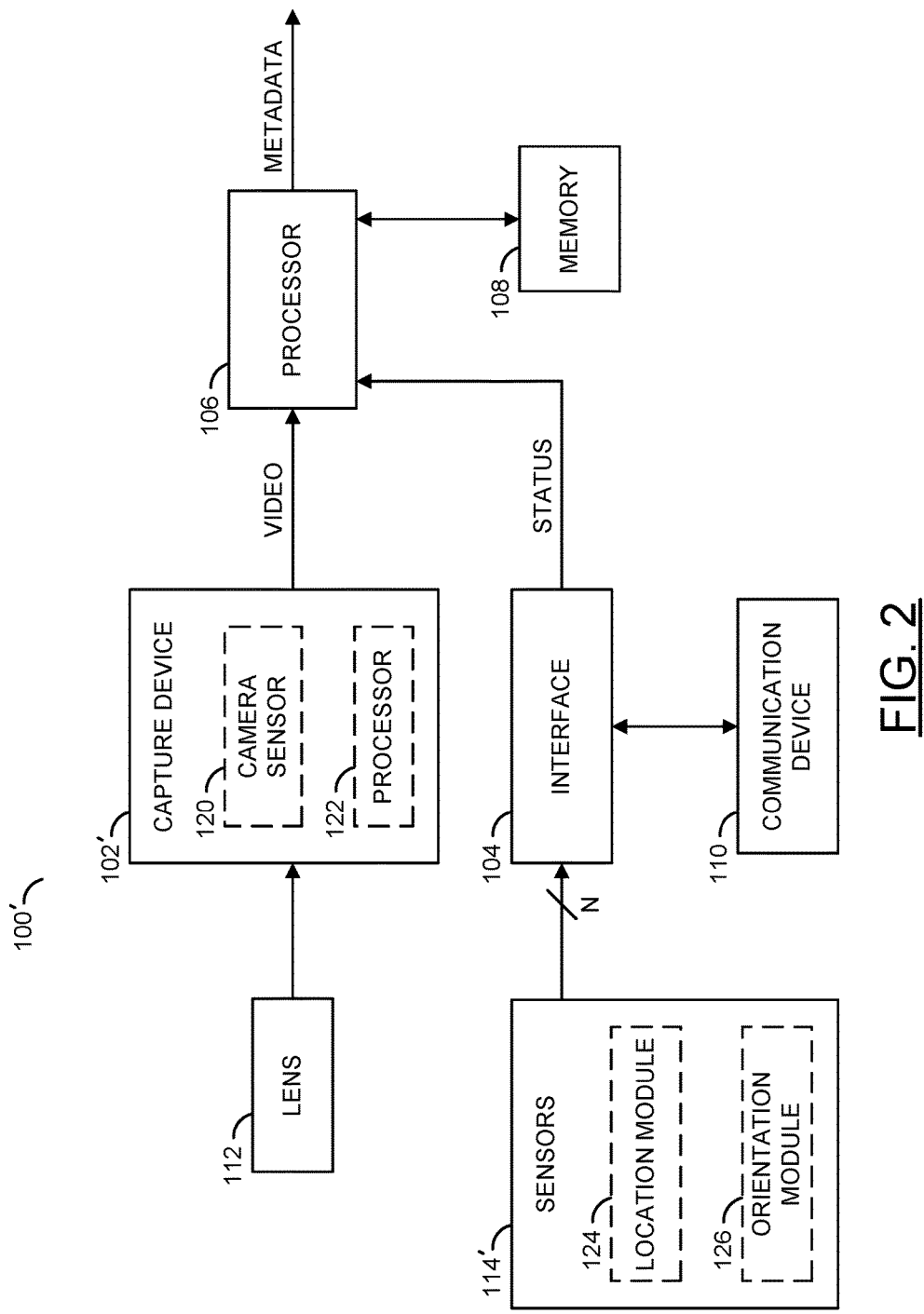
FIG. 2 is a block diagram of another example embodiment of an apparatus.

Referring to FIG. 2, a block diagram of the apparatus 100' is shown in accordance with an embodiment of the present invention. The camera system 100' may comprise the capture device 102', the interface 104, the processor 106, the memory 108, the communication device 110, the lens 112 and/or the sensors 114'. The camera system 100' may be a distributed system (e.g., each component may be implemented separately throughout an installation location such as a vehicle). The capture device 102' may comprise a block (or circuit) 120 and/or a block (or circuit) 122. The circuit 120 may be a camera sensor (e.g., a camera sensor separate from the sensors 114'). The circuit 122 may be a processor (e.g., a processor separate from the processor 106). The capture device 102' may implement a separate internal memory (e.g., a memory separate from the memory 108). The sensors 114' may comprise a block (or circuit) 124 and/or a block (or circuit) 126. The circuit 124 may be a location module. In one example, the location module 124 may be configured as a GPS component. The circuit 126 may be an orientation module. In one example, the orientation module 126 may be configured as a magnetometer component. Other types of sensors may be implemented as components of the sensors 114'.

Figure 3:
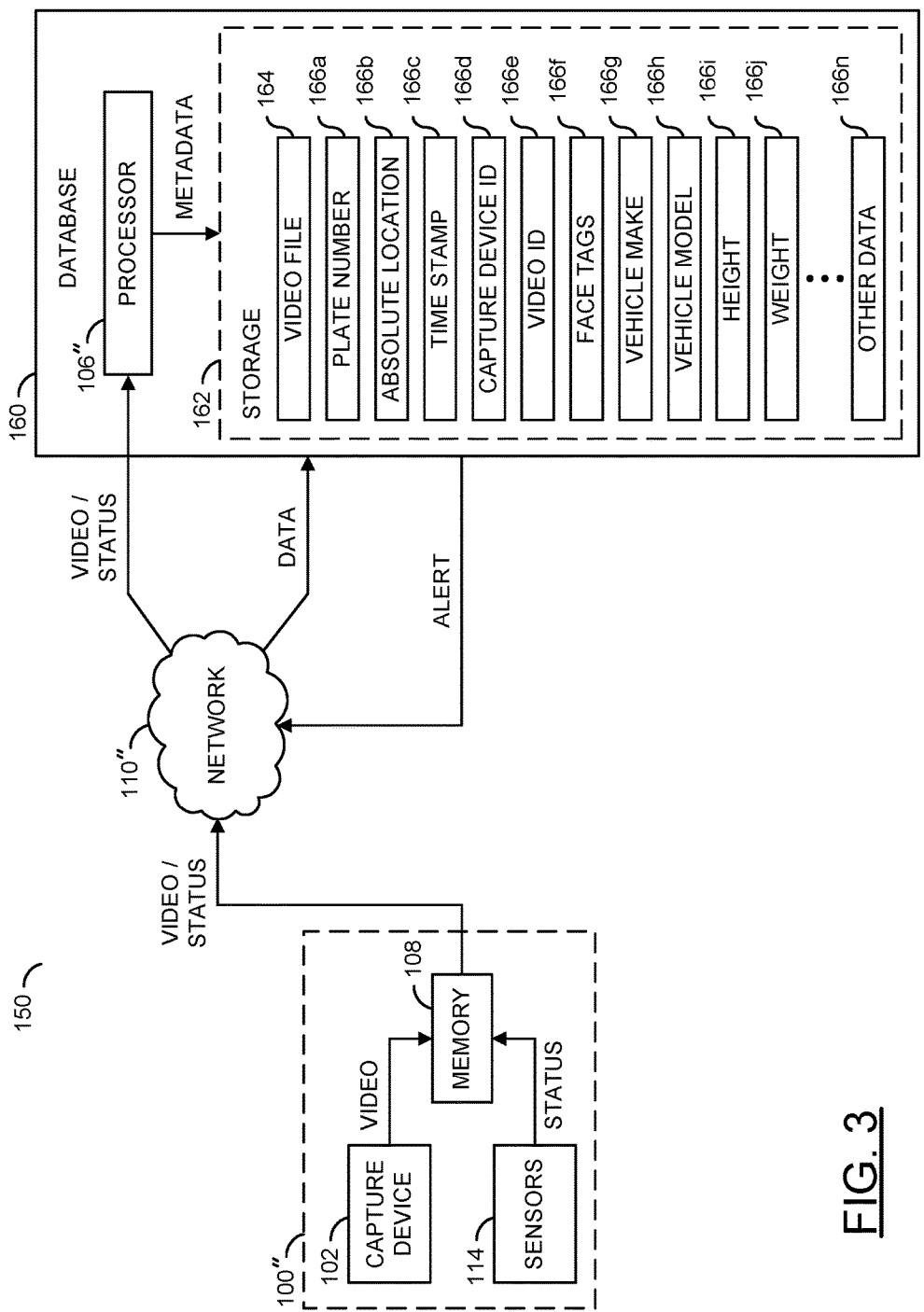
FIG. 3 is a block diagram of an example embodiment of searchable metadata in a database.

Referring to FIG. 3, a block diagram of an example embodiment 150 having searchable metadata in a database is shown. The embodiment 150 shows the camera system 100", the network 110" and a block (or circuit) 160. The network 110" may be a local network and/or a wide area network (e.g., the Internet). The circuit 160 may be configured as a database server. Other components may be implemented as part of the embodiment 150 according to the design criteria of a particular implementation.

The camera system 100" is shown configured to present the signals VIDEO and/or STATUS to the network 110". For example, the signals may be transmitted via USB, Ethernet, Wi-Fi, Bluetooth, etc. The capture device 102 is shown presenting the signal VIDEO to the memory 108. The sensors 114 are shown presenting the signal STATUS to the memory 108. The memory 108 may store and/or combine the signals VIDEO and/or STATUS. In some embodiments, the signals VIDEO and/or STATUS may be combined by the processor 122 (e.g., a local processor of the camera system 100"). In some embodiments, a connection and/or an interface of the camera system 100 may be implemented to transmit the signals VIDEO and/or STATUS to the network 110".

In some embodiments, the camera system 100 may store the status information (e.g., the signal STATUS) received from the sensors 114 (or the interface 104) in the memory 108 along with the video file (e.g., the signal VIDEO). The status information may be saved as a text track in the video file. The video file may be uploaded to the server 160 via the network 110".

In some embodiments, the camera system 100 may live stream the signal VIDEO and the status information to the database server 160 via the network 110". For example, the live streamed data may be communicated via hard-wired communication (e.g., Ethernet), Wi-Fi communication and/or cellular communication. The method of transmitting the signals VIDEO and/or STATUS may be varied according to the design criteria of a particular implementation.

The network 110" is shown receiving the signals VIDEO and/or STATUS from the camera system 100". The network 110" is shown presenting the signals VIDEO and/or STATUS to the database 160. The network 110" is shown presenting a signal (e.g., DATA) to the database 110". For example, the signal DATA may comprise information from other sources (e.g., an external database and/or resource such as a list of wanted fugitives and/or stolen vehicles). The signal data may be provided by numerous different sources (e.g., different database servers). The network 110" is shown receiving a signal (e.g., ALERT). The network 110" may transmit the signal ALERT to appropriate authorities and/or pre-defined recipients.

The database 160 may comprise the processor 106" and/or a block (or circuit) 162. The circuit 162 may be configured as storage. The storage 162 may be implemented as a magnetic storage medium (e.g., storage tape, hard disk drives, etc.), optical media and/or flash storage. The type of the storage 162 may be varied according to the design criteria of a particular implementation. The storage 162 may be searchable. The storage 162 is shown storing various types of data 164 and 166a-166n. The data 164 may be a video file (e.g., the signal VIDEO). The data 166a-166n may be metadata information. The metadata information 166a-166n may be searchable data.

The processor 106" may be implemented as part of the database server 160. The processor 106" may analyze the signal VIDEO and/or the signal STATUS (e.g., the status information) on the database server 160 in order to generate the signal METADATA. The signal METADATA and/or the signal VIDEO may be stored in the storage 162. The processed video may be stored as the video file 164 and/or the corresponding metadata 166a-166n.

The metadata information 166a-166n may be electronically stored data. The metadata information 166a-166n may be stored as alphanumeric characters and/or other data types (e.g., plain-text, binary data, hexadecimal numbers, etc.). The metadata information 166a-166n may be stored in data fields. The context of the metadata information 166a-166n may be based on the associated data field.

Generally, the metadata information 166a-166n may comprise contextual, processing and/or use information that may assist with identification/certification of a scope, authenticity and/or integrity of the electronically stored information. The metadata information 166a-166n generally comprises information related to one or more of the detected objects 202a-202n, information related to the targeted view of the environment and/or information related to the camera system 100 (e.g., camera specification, camera features, zoom settings, color settings, exposure settings, aperture settings, ISO settings, shutter speed settings, etc.).

The metadata information 166a-166n may comprise a license plate number, an absolute location (or coordinates) of the camera system 100, an absolute location (or coordinates) of the detected objects 202a-202n, a timestamp corresponding to when the video/image was recorded, an ID of the camera system 100, a video file ID, tags associated with facial recognition, vehicle make, vehicle model, height of a person, weight of a person, age of a person and/or other data. The metadata information 166a-166n may be uploaded and/or stored in the searchable database 160. For example the metadata information 166a-166n may be uploaded via hard-wired communication, Wi-Fi communication and/or cellular communication. The type of communication may be varied according to the design criteria of a particular implementation.

The metadata information 166a-166n may allow the corresponding video file 164 to be searchable. Search criteria may be cross-referenced with the metadata information 166a-166n. For example, the search criteria may be a search for a person, a search for a vehicle, a search for a license plate, etc. The search criteria may be varied according to the design criteria of a particular implementation.

The database 160 may generate the signal ALERT in response to a match of the search criteria (e.g., the signal DATA) with the metadata information 166a-166n. For example, database servers providing the signal DATA may be servers that are separate from the database server 160 used to aggregate the metadata information 166a-166n. The servers providing the signal(s) DATA may be a many-to-one or a many-to-many relationship with the database server 160 (e.g., many separate servers may provide the signal(s) DATA to a single database server 160 and/or many separate servers may provide the signal(s) DATA to many database servers 160 used to aggregate the metadata information 166a-166n). The number of servers implemented and/or the types of data stored and/or the types of data shared between servers may be varied according to the design criteria of a particular implementation.

In some embodiments, the signal ALERT may be an alert and/or notification in response to a face and/or license plate of the metadata information 166a-166n matching the search criteria from an external source (e.g., the signal DATA from an external source such as a wanted fugitive database, stolen vehicle database, missing person database, etc.). In some embodiments, the detected faces (e.g., the metadata information 166f) may be cross-referenced against existing, external databases (e.g., a most wanted list) and/or tagged with names and/or other identification information available in the database (e.g., facial features, piercings, visible tattoos, etc.), which can then be inserted into the same kind of searchable database.

Figure 4:
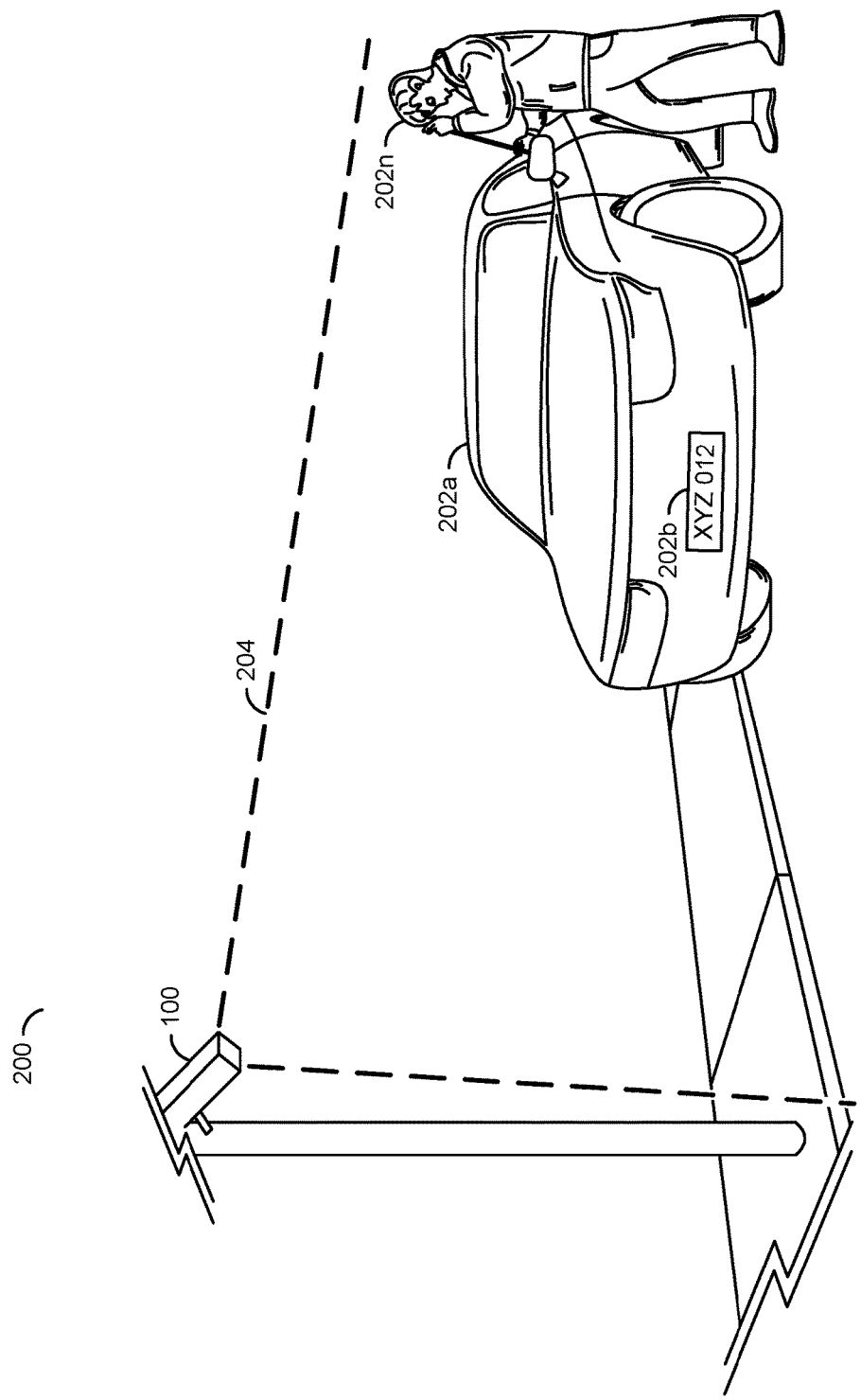
FIG. 4 is a diagram illustrating a camera system detecting objects.

Referring to FIG. 4, an implementation 200 illustrating the camera system 100 detecting objects is shown. The camera system 100 is shown installed at a high vantage point (e.g., on a street lamp post). The objects 202a-202n are shown. The object 202a may be a vehicle. The object 202b may be a license plate. The object 202n may be a person. The person 202n is shown attempting to break into the vehicle 202a.

The camera system 100 is shown having a field of view 204. The field of view 204 is shown encompassing the detected objects 202a-202n. For example, the camera system 100 may capture the targeted view of the environment (e.g., the field of view 204). The processor 106 and/or the processor 122 may analyze the video file corresponding to the targeted view of the environment. The processor 106 and/or the processor 122 may detect the objects 202a-202n.

Based on the field of view 204, a distance to the detected objects 202a-202n and/or absolute coordinates of the detected objects 202a-202n may be determined by the camera system 100. The camera system 100 may be located a distance (e.g., 10 feet or greater) away from the detected objects 202a-202n. Location information of the camera system 100 (e.g., GPS data) may be insufficient to determine an absolute location (or coordinates) of the detected objects 202a-202n (e.g., the location of the camera system 100 may be an insufficient proxy). The camera system 100 may determine a location of the camera system 100 relative to the detected objects 202a-202n. The camera system 100 is shown located above the detected objects 202a-202n and aimed in a relatively downwards direction. The sensors 114 may determine an azimuth and/or angle of the camera system 100. Using the status information of the camera system 100 and/or information about the orientation of the camera system 100, an absolute location and/or absolute coordinates of the detected objects 202a-202n may be determined.

In some embodiments, the camera system 100 may be installed at a fixed location. For example, the status information of the camera system 100 may be pre-programmed in the camera system 100 based on the fixed location of the camera system 100. The camera system 100 may determine the orientation of the camera system 100 and/or the field of view 204 during operation to determine the location of the detected objects 202a-202n. In some embodiments, the camera system 100 may be installed for mobile use (e.g., a dash mounted camera on a vehicle, a wearable camera, a remotely piloted vehicle (drone) camera, etc.). For example, the status information may change as the camera system 100 is moved during operation.

In some embodiments, the camera system 100 may be configured to detect particular types of objects (e.g., vehicles, license plates, faces, animals, etc.). For example, the camera system 100 may be configured to detect stolen vehicles and/or be pre-programmed to store reference vehicles to allow the camera system 100 to quickly determine a make, model and/or year of the detected vehicle 202a. In another example, an online database may be implemented with information for various types of detected objects (e.g., a connection to the online database may be implemented via the communication device 110) and the information may be downloaded and stored in the camera system 100. The implementation of the camera system 100 and/or a method of storing information about the various types of potential detected objects may be varied according to the design criteria of a particular implementation.

The capture device 102 may be configured to capture video image data (e.g., from the lens 112). In some embodiments, the capture device 102 may be a video capturing device such as a camera. In some embodiments, the capture device 102 may be a component of a camera (e.g., a camera pre-installed at a fixed location such as a security camera). The capture device 102 may capture data received through the lens 112 to generate a bitstream (e.g., generate video frames). For example, the capture device 102 may receive light from the lens 112. The lens 112 may be directed, panned, zoomed and/or rotated to provide a targeted view of the environment (e.g., the field of view 204).

The capture device 102 may transform the received light into digital data (e.g., a bitstream). In some embodiments, the capture device 102 may perform an analog to digital conversion. For example, the capture device 102 may perform a photoelectric conversion of the light received by the lens 112. The capture device 102 may transform the bitstream into video data, a video file and/or video frames (e.g., perform encoding). For example, the video data may be a digital video signal. The digital video signal may comprise video frames (e.g., sequential digital images).

The video data of the targeted view of the environment (e.g., the field of view 204) may be represented as the signal/bitstream/data VIDEO (e.g., a digital video signal). The capture device 102 may present the signal VIDEO to the processor 106. The signal VIDEO may represent the video frames/video data. The signal VIDEO may be a video stream captured by the capture device 102. In some embodiments, the capture device 102 may be implemented in the camera. In some embodiments, the capture device 102 may be configured to add to existing functionality of the camera.

In some embodiments, the capture device 102 may be pre-installed at a pre-determined location and the camera system 100 may connect to the capture device 102. In other embodiments, the capture device 102 may be part of the camera system 100. The capture device 102 may be configured for security monitoring. For example, the capture device 102 may be implemented to detect break-ins and/or vandalism. The capture device 102 may be configured to detect faces in a region of a video frame. The capture device 102 may be configured to recognize faces through facial recognition (e.g., based on faces stored in the memory 108). The camera system 100 may be configured to leverage pre-existing functionality of the pre-installed capture device 102. The implementation of the capture device 102 may be varied according to the design criteria of a particular implementation.

In some embodiments, the capture device 102' may implement the camera sensor 120 and/or the processor 122. The camera sensor 120 may receive light from the lens 112 and transform the light into digital data (e.g., the bitstream). For example, the camera sensor 120 may perform a photoelectric conversion of the light from the lens 112. The processor 122 may transform the bitstream into a human-legible content (e.g., video data). For example, the processor 122 may receive pure (e.g., raw) data from the camera sensor 120 and generate (e.g., encode) video data based on the raw data (e.g., the bitstream). The capture device 102' may have a memory to store the raw data and/or the processed bitstream. For example, the capture device 102' may implement a frame memory and/or buffer to store (e.g., provide temporary storage and/or cache) one or more of the video frames (e.g., the digital video signal). The processor 122 may perform analysis on the video frames stored in the memory/buffer of the capture device 102'.

In some embodiments the capture device 102' may be configured to determine a location of the detected objects 202a-202n. For example, the processor 122 may analyze the captured bitstream (e.g., using machine vision processing), determine a location of the detected objects 202a-202n and present the signal VIDEO (e.g., comprising information about the location of the detected objects 202a-202n) to the processor 106. The processor 122 may be configured to determine the location of the detected objects 202a-202n (e.g., less analysis is performed by the processor 106). In another example, the processor 122 may generate the signal VIDEO comprising video frames and the processor 106 may analyze the video frames to determine the location of the detected objects 202a-202n (e.g., more analysis is performed by the processor 106). The analysis performed by the processor 122 and/or the processor 106 may be varied according to the design criteria of a particular implementation.

In some embodiments, the processor 122 may be implemented as a local processor for the camera system 100" and the processor 106" may be implemented as an external processor (e.g., a processor on a device such as the database 160). The processor 122 may be configured to combine the signal VIDEO and the signal STATUS for storage in the memory 108 (e.g., embed the status information in the video file as a text track, control channel, RTP stream, etc.). The camera system 100" may be configured to transmit the signal VIDEO with embedded status information to the database 160. The external processor 106" may be configured to perform the detection of the objects 202a-202n, the determination of the absolute coordinates of the detected objects 202a-202n, the generation of the metadata information 166a-166n and/or comparisons with information from external sources (e.g., the signal DATA).

The interface 104 may receive data from one or more of the sensors 114. The signal STATUS may be generated in response to the data received from the sensors 114 at a time of generation of the signal VIDEO. In some embodiments, the interface 104 may receive data from the location module 124. In some embodiments, the interface 104 may receive data from the orientation module 126. In some embodiments, the interface 104 may receive data from the processor 106 and/or the communication device 110. The interface 104 may send data (e.g., instructions) from the processor 106 to connected devices via the communications device 110. For example, the interface 104 may be bi-directional.

In the example shown (e.g., in FIG. 1 and FIG. 2), information from the sensors 114 (e.g., the location module 124, the orientation module 126, etc.) may be received by the interface 104. In one example, where the camera system 100 is installed in a vehicle, the interface 104 may be implemented as an electronic bus (e.g., a controller area network (CAN) bus) and the sensors 114 may be part of the vehicle. In another example, the interface 104 may be implemented as an Ethernet interface. In yet another example, the interface 104 may be implemented as an electronic device (e.g., a chip) with a CAN bus controller. In some embodiments, the sensors 114 may connect directly to the processor 106 (e.g., the processor 106 may implement a CAN bus controller for compatibility, the processor 106 may implement a serial peripheral interface (SPI), the processor 106 may implement another interface, etc.). In some embodiments, the sensors 114 may connect to the memory 108.

The processor 106 may be configured to execute computer readable code and/or process information. The processor 106 may be configured to receive input and/or present output to the memory 108. The processor 106 may be configured to present and/or receive other signals (not shown). The number and/or types of inputs and/or outputs of the processor 106 may be varied according to the design criteria of a particular implementation.

In some embodiments, the processor 106 may receive the signal VIDEO from the capture device 102 and detect the objects 202a-202n in the video frame. In some embodiments, the processor 122 may be configured to detect the objects 202a-202n and the processor 106 may receive the location (or coordinates) of detected objects 202a-202n in the video frame from the capture device 102'. In some embodiments, the processor 106 may be configured to analyze the video frame (e.g., the signal VIDEO). The processor 106 may be configured to detect a location and/or position of the detected objects 202a-202n in the video frame. The processor 106 may determine a distance of the detected objects 202a-202n from the camera (e.g., the lens 112) based on information from the signal STATUS. In some embodiments, the processor 106 may receive the location (or coordinates) of the detected objects 202a-202n from the capture device 102' and distance of the detected objects 202a-202n from the sensors 114 through the interfaces 104. The information received by the processor 106 and/or the analysis performed by the processor 106 may be varied according to the design criteria of a particular implementation.

Based on the distance and/or location of the detected objects 202a-202n in the video frame (e.g., the signal VIDEO), the processor 106 may determine the absolute location and/or the absolute coordinates of the detected objects 202a-202n. The absolute coordinates of the detected objects 202a-202n may be based on the signal VIDEO and/or the signal STATUS. The processor 106 may generate the signal METADATA in response to the determined absolute position of the detected objects 202a-202n.

The signal METADATA may be implemented to provide searchable data (e.g., tags) corresponding to the video file. For example, the signal METADATA may be stored in the searchable database 160. In another example, the signal METADATA may be stored in the memory 108. Generally, the signal METADATA is searchable. Generally the signal METADATA may correspond to a location of the detected objects 202a-202n. The utilization of the data stored in the signal METADATA and/or the metadata information 166a-166n may be varied according to the design criteria of a particular implementation. In some embodiments, the signal METADATA may be presented to the communication device 110 and the communication device 110 may pass the signal METADATA to an external network and/or external storage. In some embodiments, the signal METADATA may be presented directly to the storage 162 by the processor 106.

The processor 106 and/or the processor 122 may be implemented as an application specific integrated circuit (e.g., ASIC) or a system-on-a-chip (e.g., SOC). The processor 106 and/or the processor 122 may be configured to determine a current size of the detected objects 202a-202n (e.g., an object having a reference size). The processor 106 and/or the processor 122 may detect one or more of the detected objects 202a-202n in each video frame. The processor 106 and/or the processor 122 may determine a number of pixels (e.g., a width, a height and/or a depth) comprising the detected objects 202a-202n in the video frame. Based on the number of pixels of each of the detected objects 202a-202n in the video frame, the processor 106 and/or the processor 122 may estimate a distance of the detected objects 202a-202n from the lens 112. Whether the detection of the objects 202a-202n is performed by the processor 106 and/or the processor 122 may be varied according to the design criteria of a particular implementation.

The memory 108 may store data. The memory 108 may be implemented as a cache, flash memory, DRAM memory, etc. The type and/or size of the memory 108 may be varied according to the design criteria of a particular implementation. The data stored in the memory 108 may correspond to the detected objects 202a-202n, reference objects, the video file 164 and/or the metadata information 166a-166n. For example, the memory 108 may store a reference size (e.g., the number of pixels of an object of known size in a video frame at a known distance) of the objects 202a-202n. The reference size stored in the memory 108 may be used to compare the current size of the detected objects 202a-202n in a current video frame. The comparison of the size of the detected objects 202a-202n in the current video frame and the reference size may be used to estimate a distance of the objects 202a-202n from the lens 112.

The memory 108 may store the pre-determined location of the camera system 100 and/or a pre-determined field of view 204 of the camera system 100 (e.g., when the camera system 100 is implemented as a fixed view security camera). For example, the status information of the camera system 100 may be updated by over-writing the status information stored in the memory 108. The communication device 110 may send and/or receive data to/from the interface 104. In some embodiments, when the camera system 100 is implemented as a vehicle camera, the communication device 110 may be the OBD of the vehicle. In some embodiments, the communication device 110 may be implemented as a satellite (e.g., a satellite connection to a proprietary system). In one example, the communication device 110 may be a hard-wired data port (e.g., a USB port, a mini-USB port, a USB-C connector, HDMI port, an Ethernet port, a DisplayPort interface, a Lightning port, etc.). In another example, the communication device 110 may be a wireless data interface (e.g., Wi-Fi, Bluetooth, ZigBee, cellular, etc.).

The lens 112 (e.g., a camera lens) may be directed to provide a targeted view of the environment (e.g., the field of view 204). In one example, the lens 112 may be mounted on a dashboard of a vehicle. In another example, the lens 112 may be wearable camera (e.g., a camera worn by a police officer, a camera worn by an athlete, a camera worn by a first responder, a camera worn by a thrill-seeker, etc.). The lens 112 may be aimed to capture environmental data (e.g., light). The lens 112 may be configured to capture and/or focus the light for the capture device 102. Generally, the sensor 120 is located behind the lens 112. Based on the captured light from the lens 112, the capture device 102 may generate a bitstream and/or video data.

The sensors 114 may be configured to determine a location and/or orientation of the camera system 100. The number and/or types of data used to determine the location and/or orientation of the camera system 100 may be varied according to the design criteria of a particular implementation. In one example, the location module 124 may be used to determine an absolute location of the camera system 100. In another example, the orientation module 126 may be used to determine an orientation of the camera system 100. Generally, information from the sensors 114 may be an insufficient proxy for the absolute location and/or absolute coordinates of the detected objects 202a-202n. Data from the sensors 114 may be presented to the processor 106 as the signal STATUS. In some embodiments, the data from the sensors 114 may be part of the metadata information 166a-166n.

The sensors 114 (e.g., the location module 124, the orientation module 126 and/or the other types of sensors) may be configured to determine an absolute location and/or an azimuth orientation of the camera system 100. The absolute location and/or the azimuth orientation of the camera system 100 may be added to the relative location of the detected objects 202a-202n to determine an absolute location (e.g., coordinates) of the detected objects 202a-202n.

The signal STATUS may provide location information and/or orientation information for the camera system 100 (e.g., the status information). The location information may be determined by the location module 124. For example, the location module 124 may be implemented as a GPS sensor. The orientation information may be determined by the orientation module 126. For example, the orientation module 126 may be implemented as a magnetometer, an accelerometer and/or a gyroscope. The types of sensors used to implement the location module 124 and/or the orientation module 126 may be varied according to the design criteria of a particular implementation. In some embodiments, the signal STATUS may provide details about the camera system 100 (e.g., camera specifications, camera identity, the field of view 204, date, time, etc.).

Figure 5:
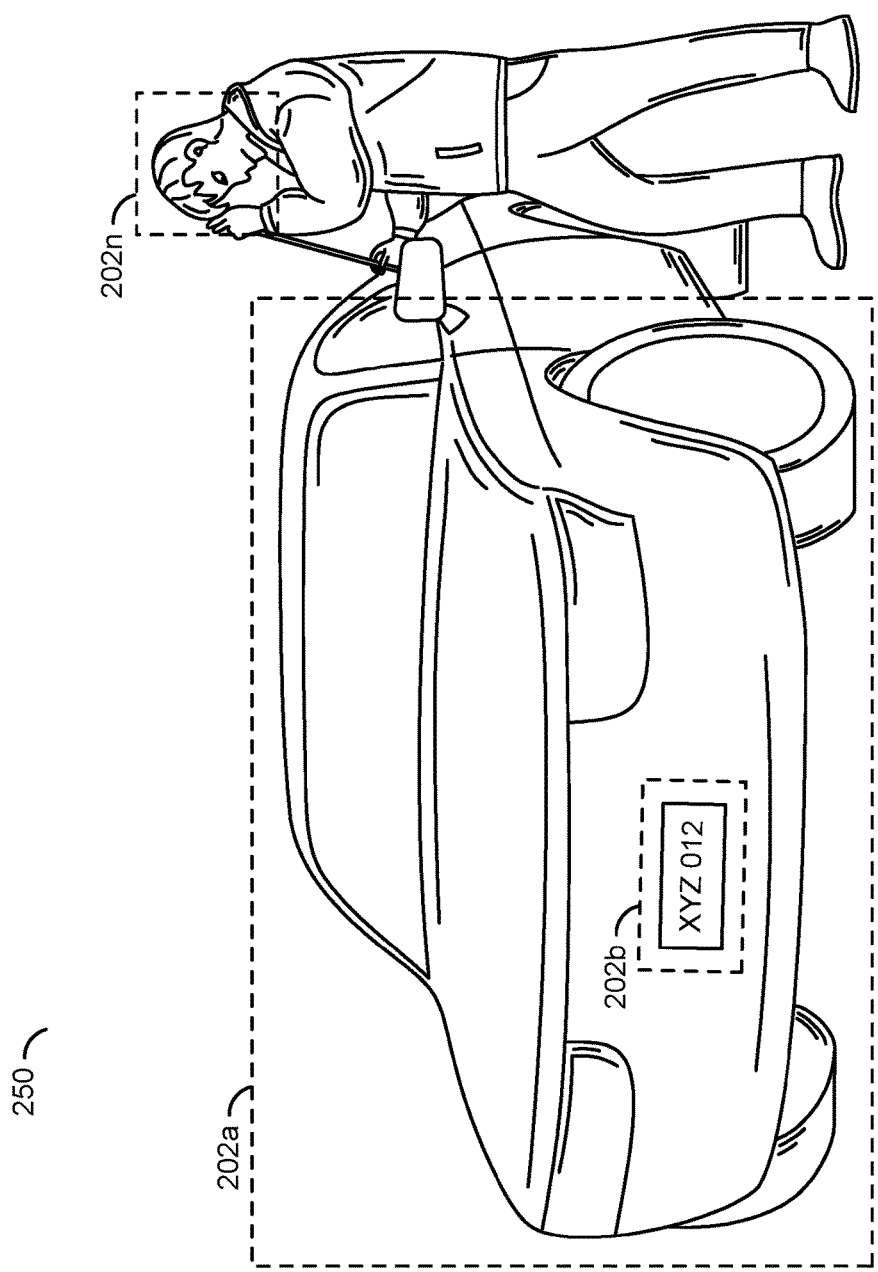
FIG. 5 is a diagram illustrating detected objects in a video frame.

Referring to FIG. 5, a video frame 250 with the detected objects 202a-202n is shown. The video frame 250 may be a video frame generated by the capture device 102. The video frame 250 may represent a targeted view captured by the lens 112. For example, the camera system 100 may be mounted on a dashboard of a police patrol vehicle. The view captured for each of the video frames may be varied according to the design criteria of a particular implementation.

The processor 106 and/or the processor 122 may determine the width, height and/or depth of the detected objects 202a-202n (e.g., based on the number of pixels the detected objects 202a-202n occupy in the video frame 250). The memory 108 may store the width, height and/or depth of the detected objects 202a-202n. In some embodiments, the memory 108 may store reference objects. For example, the width, height and/or depth in pixels of the reference objects may be stored. The processor 106 and/or the processor 122 may be configured to compare the detected objects 202a-202n with the stored reference objects.

In some embodiments, the capture device 102 may send the signal VIDEO as the current frame 250 to the processor 106. In another example, the processor 122 may generate and/or analyze the current frame 250 (e.g., the current frame 250 may be stored in a memory of the capture device 102') and send a result of the analysis (e.g., a location of the detected objects 202a-202n in the frame 250 and/or an analysis of the angle of the detected objects 202a-202n with respect to the capture device 102') to the processor 106.

The frame 250 shows the detected vehicle 202a, the detected license plate 202b and the detected person 202n. The frame 250 may be analyzed by the processor 106 and/or the processor 122. The processor 106 and/or the processor 122 may detect the location of the detected objects 202a-202n in the frame 250 and/or the angle of the detected objects 202a-202n based on the field of view 204. Boxes around the detected objects 202a-202n may represent the objects being detected by the processor 106 and/or the processor 122 in the current frame 250.

The distance of the detected objects 202a-202n from the lens 112 may be estimated based on the reference objects stored in the memory 108. In some embodiments, the distance of the detected objects 202a-202n from the lens 112 may be estimated based on depth-sensing technology of the camera system 100 (e.g., stereoscopic, time-of-flight, structured-light, etc.). The estimations performed may be varied according to the design criteria of a particular implementation.

The processor 106 and/or the processor 122 may determine the width, height and/or depth of the detected objects 202a-202n (e.g., the number of pixels in the video frame 250). The memory 108 may store the width, height and/or depth of the reference objects. The width, height and/or depth of the detected objects 202a-202n may be compared to the width, height and/or depth of the reference objects by the processor 106 and/or the processor 122. Based on the comparison of a size of the detected objects 202a-202n to the reference objects, the processor 106 and/or the processor 122 may estimate a distance of the detected objects 202a-202n from the lens 112.

Using the detected objects 202a-202n and the estimated distance of the detected objects 202a-202n from the lens 112, the processor 106 and/or the processor 122 may determine the position (e.g., 3D coordinates and/or location coordinates) of the detected objects 202a-202n. For example, the location of the detected objects 202a-202n may represent one coordinate (e.g., a location coordinate on a first axis) for a vertical location of each detected object 202a-202n in 3D space, and one coordinate (e.g., a location coordinate on a second axis) for a horizontal location of each detected object 202a-202n in 3D space. The determined distance from the lens 112 may represent one coordinate (e.g., a location coordinate on a third axis) for a depth location of each of the detected objects 202a-202n in 3D space. For example, the processor 122 may determine the coordinates of the detected objects 202a-202n in 3D space and transmit the location (e.g., using the signal VIDEO) to the processor 106.

The processor 106 may generate the signal METADATA in response to one or more of the detected objects 202a-202n and/or the location of the detected objects 202a-202n in the frame 250. The signal METADATA may provide searchable data about the detected objects 202a-202n corresponding to the frame 250 and/or the corresponding video file 164.

The face of the person 202n may be detected and stored as part of the metadata 166a-166n. The make of the vehicle 202a may be detected and stored as part of the metadata 166a-166n. The alphanumeric characters on the license plate 202b may be detected and stored as part of the metadata 166a-166n. The type of information stored in the signal METADATA may be varied according to the design criteria of a particular implementation.

The location of the detected objects 202a-202n in the video frame 250 may be combined with knowledge of the field of view 204 of the camera system 100. Based on the location of the detected objects 202a-202n in the video frame 250 and/or the field of view 204, the camera system 100 may determine an angle of the detected objects 202a-202n with respect to the lens 112. The distance and the angle may be used by the camera system 100 to determine a relative location of the detected objects 202a-202n relative to the camera system 100.

Figure 6:
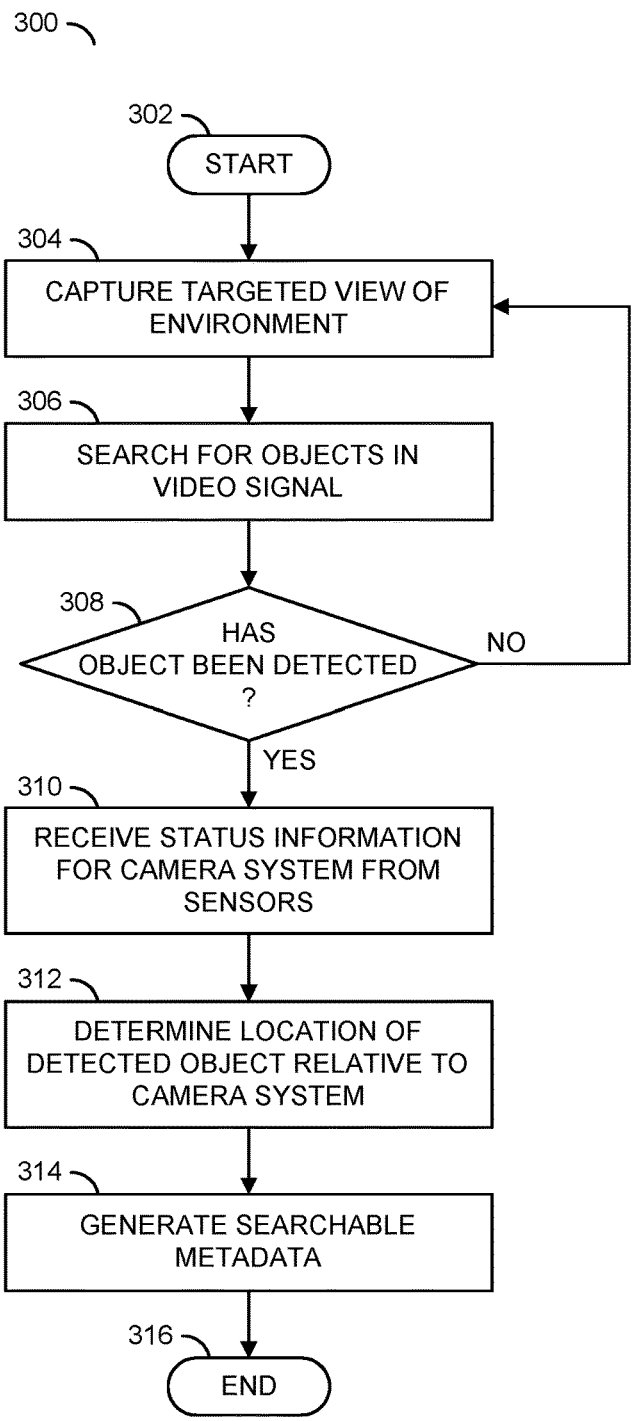
FIG. 6 is a flow diagram illustrating a method for generating searchable metadata based on a relative location of a detected object.

Referring to FIG. 6, a method (or process) 300 is shown. The method 300 may generate searchable metadata based on a relative location of a detected object. The method 300 generally comprises a step (or state) 302, a step (or state) 304, a step (or state) 306, a decision step (or state) 308, a step (or state) 310, a step (or state) 312, a step (or state) 314, and a step (or state) 316.

The state 302 may start the method 300. The state 304 may capture a targeted view of the environment (e.g., using the capture device 102). The state 306 may search for objects in the video signal (e.g., search the signal VIDEO using the processor 106 and/or the processor 122). Next, the method 300 may move to the decision state 308.

If the decision state 308 determines an object has not been detected, the method 300 may return to the state 304. If the decision state 308 determines an object has been detected, the method 300 may move to the state 310. The state 310 may receive status information for the camera system 100 from the sensors 114.

Next, the state 312 may determine a location of the detected object relative to the camera system 100 (e.g., based on the status information of the camera system 100, the location of the detected objects 202a-202n in the video frame 250 with respect to the field of view 204 and/or the orientation of the camera system 100). The state 314 may generate searchable metadata (e.g., the signal METADATA). For example, the searchable metadata may be generated based on optical character recognition (OCR). Next the state 316 may end the method 300.

Figure 7:
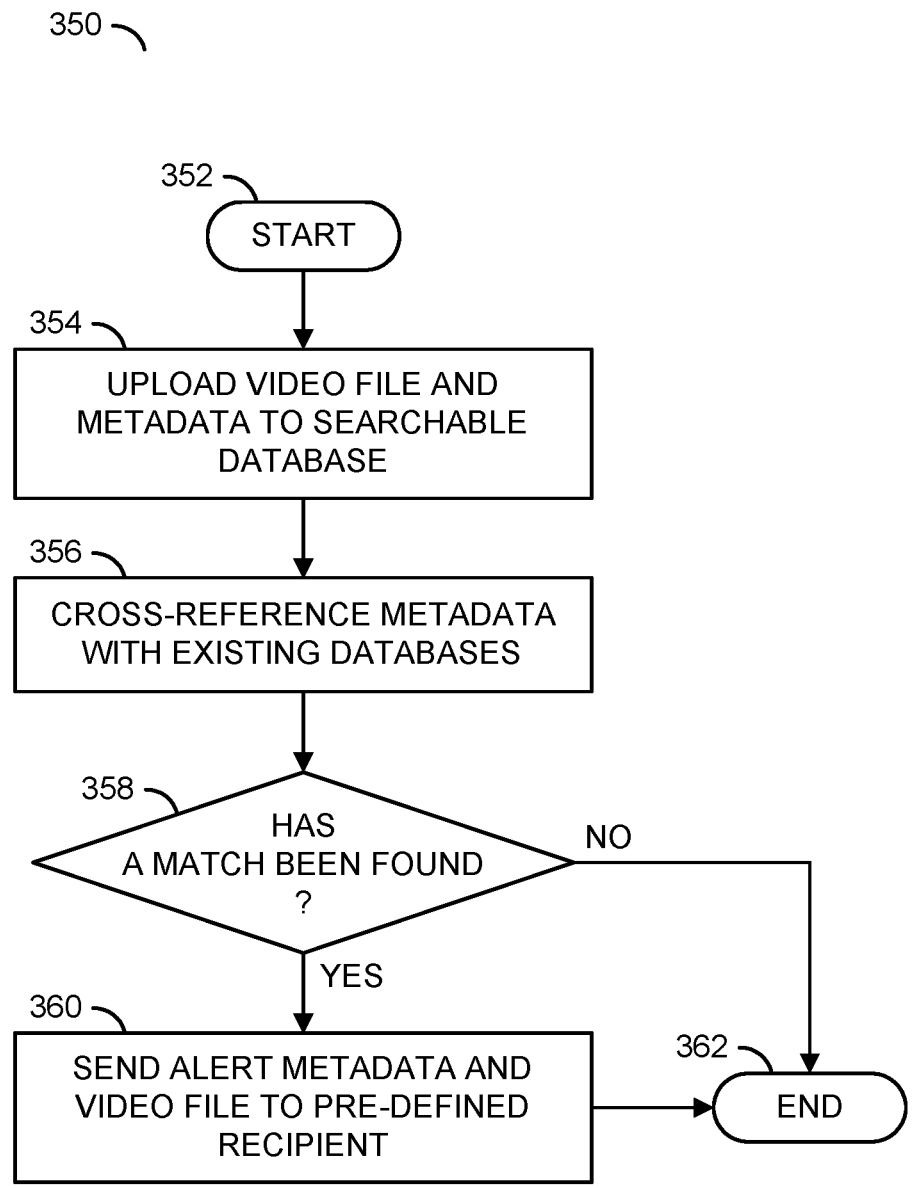
FIG. 7 is flow diagram illustrating a method for alerting a recipient based on a cross-reference match between a detected object and database information.

Referring to FIG. 7, a method (or process) 350 is shown. The method 350 may alert a recipient based on a cross-reference match between a detected object (e.g., using the metadata information 166a-166n) and database information. The method 350 generally comprises a step (or state) 352, a step (or state) 354, a step (or state) 356, a decision step (or state) 358, a step (or state) 360, and a step (or state) 362.

The state 352 may start the method 350. Next, the state 354 may upload the video file (e.g., the signal VIDEO and/or the video file 164) and/or the metadata (e.g., the signal METADATA and/or the metadata information 166a-166n) to the searchable database (e.g., the database 160). The state 356 may cross-reference the metadata information 166a-166n with existing databases (e.g., the signal DATA corresponding to wanted criminals, stolen vehicles, outstanding warrants, etc.). Next, the method 350 may move to the decision state 358.

If the decision state 358 determines that a match has been found, the method 350 may move to the state 360. The state 360 may send an alert (e.g., the signal ALERT) and/or the video file 164 and/or the metadata information 166a-166n to a pre-defined recipient (e.g., police authorities). Next, the method 350 may move to the state 362. If the decision state 358 determines that no match has been found, the method 350 may move to the state 362. The state 362 may end the method 350.

Figure 8:
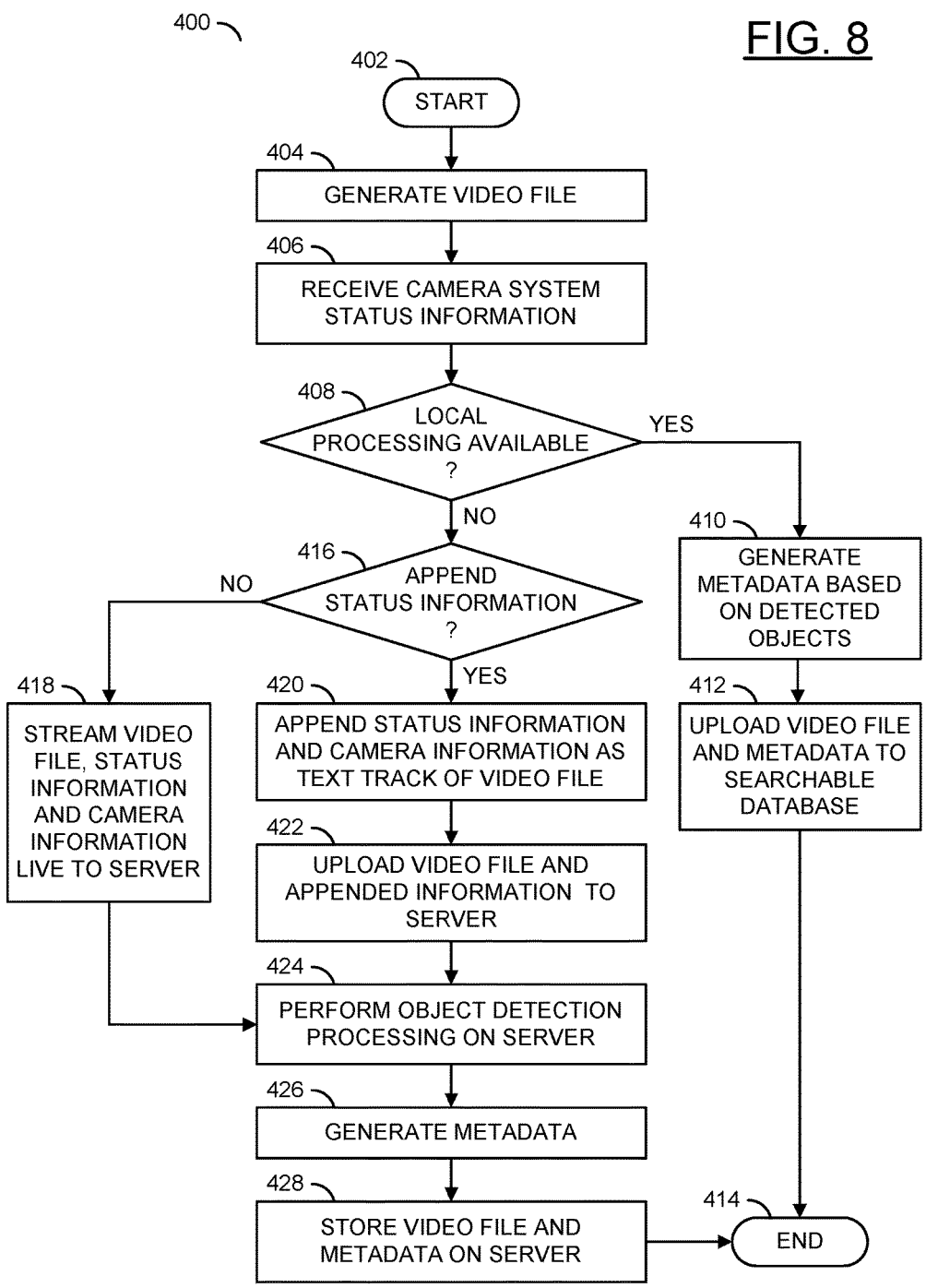
FIG. 8 is a flow diagram illustrating a method for providing remote processing for detected objects.

Referring to FIG. 8, a method (or process) 400 is shown. The method 400 may provide remote processing for detected objects. The method 400 generally comprises a step (or state) 402, a step (or state) 404, a step (or state) 406, a decision step (or state) 408, a step (or state) 410, a step (or state) 412, a step (or state) 414, a decision step (or state) 416, a step (or state) 418, a step (or state) 420, a step (or state) 422, a step (or state) 424, a step (or state) 426, and a step (or state) 428.

The state 402 may start the method 400. Next, the state 404 may generate the video file 164. The state 406 may receive camera system status information (e.g., the signal STATUS). Next, the method 400 may move to the decision state 408.

If the decision state 408 determines that local processing is available, the method 400 may move to the state 410. The state 410 may generate metadata (e.g., the metadata information 166a-166n) based on the detected objects 202a-202n. Next, the state 412 may upload the video file 164 and the metadata information 166a-166n to a searchable database (e.g., the database 160). Next, the method 400 may move to the state 414. The state 414 may end the method 400. If the decision state 408 determines that local processing is not available, the method 400 may move to the decision state 416.

If the decision state 416 determines not to append the status information, the method 400 may move to the state 418. The state 418 may stream the video file 164, the status information and/or the camera information (e.g., model, serial number, camera specifications, etc.) live to the server 160. Next, the method 400 may move to the state 424. If the decision state 416 determines to append the status information, the method 400 may move to the state 420. The state 420 may append the status information and/or the camera information as a text track to the video file 164. Next, the state 422 may upload the video file and/or the appended information to the server 160. Next, the method 400 may move to the state 424.

The state 424 may perform object detection processing on the server 160. Next, the state 426 may generate the metadata (e.g., using the processor 106 implemented on the server 160). The state 428 may store the video file 164 and the metadata information 166a-166n on the server (e.g., in the storage 162). Next, the method 400 may end at the state 414.

Figure 9:
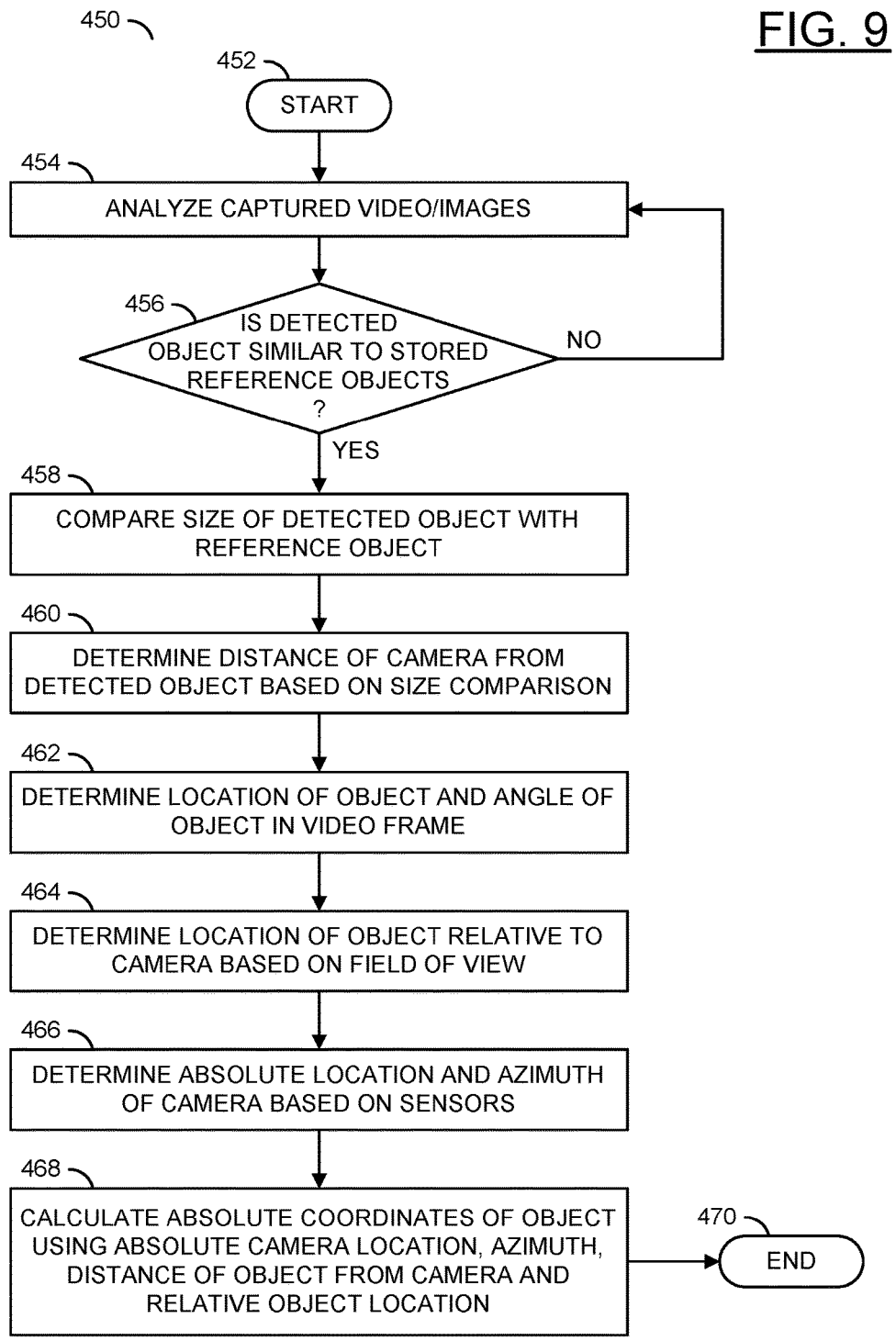
FIG. 9 is a flow diagram illustrating a method for calculating absolute location coordinates of a detected object.

Referring to FIG. 9, a method (or process) 450 is shown. The method 450 may calculate absolute coordinates of a detected object. The method 450 generally comprises a step (or state) 452, a step (or state) 454, a decision step (or state) 456, a step (or state) 458, a step (or state) 460, a step (or state) 462, a step (or state) 464, a step (or state) 466, a step (or state) 468, and a step (or state) 470. The state 452 may start the method 450. The state 454 may analyze the captured video frames and/or images. Next, the method 450 may move to the decision state 456.

If the decision state 456 determines that one or more of the detected objects 202a-202n is not similar to the stored reference objects, the method 450 may return to the state 454. If the decision state 456 determines that one or more of the detected objects 202a-202n is similar to the stored reference objects, the method 400 may move to the state 458. The state 458 may compare a size of the detected objects 202a-202n with the size of the reference object (e.g., based on a number of pixels).

The state 460 may determine a distance of the camera system 100 from the detected objects 202a-202n based on the size comparison. Next, the state 462 may determine a location of the objects 202a-202n and an angle of the objects 202a-202n in the video frame 250 (e.g., with respect to the field of view 204). The state 464 may determine the location of the detected objects 202a-202n relative to the camera system 100 based on the field of view 204. The state 466 may determine the absolute location and/or azimuth of the camera system 100 based on the sensors 114. The state 468 may calculate the absolute coordinates of the detected objects 202a-202n using the absolute camera location, azimuth, distance of the detected objects 202a-202n from the camera system 100 and the relative location of the detected objects 202a-202n. Next, the state 470 may end the method 400.

In some embodiments, the detected objects 202a-202n may be a vehicle (e.g., the detected vehicle 202a). The processor 106 and/or the processor 122 may be configured to recognize various vehicle makes and/or models. The detected vehicle 202a may be stored as part of the metadata 166a-166n. Other data about the detected vehicle 202a may be stored as part of the metadata 166a-166n (e.g., vehicle size, vehicle type, color, logos, bumper stickers, decals, and/or model names (based on OCR of text on the vehicle 202a cross-referenced against a known database of brands and makes)). The size of the vehicle 202a in the video frame 250 may be used by the processor 106 and/or the processor 122 to estimate the distance of the detected vehicle 202a from the camera lens 112.

In some embodiments, the detected objects 202a-202n may be license plates (e.g., the detected object 202b). The processor 106 and/or the processor 122 may be configured to recognize text on the detected license plate 202b using OCR. For example, the processor 106 and/or the processor 122 may detect the license plate 202b in the video frame 250. After detecting the license plate 202b, the processor 106 and/or the processor 122 may generate the metadata information 166a-166n corresponding to the license plate 202b. In one example, OCR may be performed to translate the image of the license plate 202b to text. The text on the license plate 202b may be stored as part of the metadata 166a-166n. Other data from the license plate 202b may be stored as part of the metadata 166a-166n (e.g., state/province/country name, images on the license plate, license plate renewal tags, etc.). The size of the alphanumeric letters on the detected license plate 202b may be used by the processor 106 and/or the processor 122 to estimate the distance of the detected license plate 202b from the camera lens 112.

A distance from other types of the detected objects 202a-202n may be estimated based on a size of alphanumeric letters and/or other recognized symbols on the detected objects 202a-202n. For example, the processor 106 and/or the processor 122 may compare the recognized symbols and/or alphanumeric letters on the detected objects 202a-202n with a reference image stored in the memory 108. In another example, the memory 108 may store a pre-defined regulation size (based on laws and/or regulations of a particular jurisdiction) of the license plate 202b and the processor 106 and/or the processor 122 may determine a number of pixels the detected license plate 202b occupies in the video frame to estimate a distance based on the field of view 204. The method of comparing a size of symbols and/or letters on one of the detected objects 202a-202n may be varied according to the design criteria of a particular implementation.

In some embodiments, the camera system 100 may be implemented as a depth-sensing camera (e.g., stereoscopic, time-of-flight, structured-light, etc.). If the camera system 100 is a depth-sensing camera, the distance of the detected objects 202a-202n may be calculated directly using the depth-sensing method implemented by the camera system 100.

In some embodiments, the detected objects 202a-202n may be a human face (e.g., the face 202n). The processor 106 and/or the processor 122 may be configured to perform facial detection, facial recognition and/or face tagging. For example, the processor 106 and/or the processor 122 may be configured to detect a face in a region of the frame 250. The detected face 202n and/or facial features may be stored as part of the metadata 166a-166n. Other data about the face and/or person 202n may be stored as part of the metadata 166a-166n (e.g., gender, height, weight, age, ethnicity, body type, visible tattoos, etc.). The processor 106 and/or the processor 122 may receive face information from the signal DATA and/or the memory 108. The processor 106 and/or the processor 122 may be configured to perform facial recognition (e.g., determine whether the detected face 202n matches the received face information).

In one example, the camera system 100 may be installed at an outdoor location and implemented to detect people inside a building. The outdoor location of the camera system 100 alone would be an insufficient proxy for the location of the detected objects 202a-202n inside the building (e.g., the outdoor location may not provide enough information to determine that a particular person was in a particular building). However, the sensors 114 and the processing by the camera system 100 provides absolute coordinates of the detected objects 202a-202n. The camera system 100 may be implemented to reliably determine and/or estimate the location of the detected object (e.g., the person).

In some embodiments, a use-case of the camera system 100 may be a dash camera of a police patrol car. The camera system 100 may detect a face in a window as the patrol car drives past a building. The location of the camera system 100 may be logged (e.g., from the sensors 114). Using the analysis by the processor 106 and/or the processor 122, the location of the person may be proven based on the detected face. Generally, proof that the person was inside the building may be useful if the exact (or reliably estimated) location of the person can be calculated. The location of the camera system 100 (e.g., on the dash of the patrol car) may be in the middle of the street, which may be insufficient to prove a person was inside of a building.

In some embodiments, a use-case of the camera system 100 may be a dash camera on a parking enforcement vehicle. For example, an illegally parked car may be detected. In order to prove a car is illegally parked evidence may need to show that a vehicle was in a specific location at a specific time. Generally, parking is permitted in some areas and not permitted in other nearby areas and parking may be legal based on a time of day and/or day of the week. The location of the dash mounted camera system 100 alone may only approximate a location of the parked vehicle since the patrol vehicle is in the middle of the street. The metadata information 166a-166n may indicate a precise location of the parked vehicle and provide a timestamp of when the video footage was recorded. Based on the metadata information 166a-166n, the parking violation may be proven.

In some embodiments, the camera system 100 may be implemented to detect objects 202a-202n from a far distance. For example, an optical and/or digital zoom may be implemented. The field of view 204 of the camera system 100 may detect the objects 202a-202n from a far enough distance that the location of the camera system 100 may be insufficient to provide a reliable location of the detected objects 202a-202n. The camera system 100 may determine an exact location of the detected objects 202a-202n based on the location and/or orientation of the camera system 100, the field of view 204 and/or the location and/or angle of the detected objects 202a-202n in the recorded video frame(s). Generally, for any distance above 10 feet the exact location determined by the camera system 100 may provide valuable information in the context of precise geo-tagging.

The functions performed by the diagrams of FIGS. 6-9 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a first input configured to receive a video signal from a sensor;
   a second input configured to receive status information about said apparatus at a time of generation of said video signal; and
   a processor configured to (i) detect one or more objects in said video signal, (ii) determine absolute coordinates of said one or more objects in said video signal and (iii) generate metadata, wherein (A) said absolute coordinates of said one or more objects are based on (i) said status information, (ii) a relative location of said detected objects in said video signal, (iii) an orientation of said apparatus, and (iv) a field of view of said sensor, (B) said metadata corresponds to said absolute coordinates of said one or more objects, and (C) said orientation of said apparatus is added to the relative location of the detected objects to determine said absolute coordinates.

2. The apparatus according to claim 1, wherein said metadata comprises searchable data about said detected objects corresponding to a video file generated by said processor from said video signal.

3. The apparatus according to claim 1, wherein (i) a distance of said one or more detected objects to said apparatus is determined using a depth-sensing technology of said apparatus and (ii) said distance is used to determine said relative location.

4. The apparatus according to claim 1, wherein said metadata comprises at least one of (a) information related to said one or more detected objects, (b) information related to said sensor and (c) information related to said apparatus.

5. The apparatus according to claim 1, wherein said sensor is installed separate from said apparatus.

6. The apparatus according to claim 1, wherein said metadata is uploaded to a searchable database via at least one of (a) wireless communications and (b) hard-wired communications.

7. The apparatus according to claim 6, wherein an alert is issued by said searchable database when said metadata stored in said searchable database matches against data provided by an external source.

8. The apparatus according to claim 7, wherein said data provided by said external source comprises at least one of wanted fugitives and stolen vehicles.

9. The apparatus according to claim 1, wherein said metadata is appended as a text track to a video file generated by said processor from said video signal.

10. The apparatus according to claim 1, wherein said status information comprises absolute coordinates and azimuth orientation.

11. The apparatus according to claim 1, wherein said one or more detected objects comprise license plates.

12. The apparatus according to claim 11, wherein said metadata generated for said license plates is based on optical character recognition.

13. The apparatus according to claim 1, wherein said one or more detected objects comprise human faces.

14. The apparatus according to claim 13, wherein said processor is further configured to perform facial detection to detect said human faces in a region of a video frame generated by said processor from said video signal.

15. The apparatus according to claim 13, wherein (i) said human faces are compared with face information stored in a database using facial recognition and (ii) said human faces are associated with metadata based on said face information.

16. The apparatus according to claim 1, wherein said field of view of said sensor is used by said processor to calculate (i) a distance and (ii) an angle each used to determine said relative location and said orientation of said detected objects relative to said apparatus.

17. The apparatus according to claim 1, wherein said relative location of said detected objects in said video signal is determined based on (i) a comparison of (a) a respective size of said detected objects and (b) a size of a reference object in a first mode and (ii) a comparison of (a) a number of pixels said detected object occupies in a video frame generated by said processor from said video signal and (b) said field of view in a second mode.

18. An apparatus comprising:
   a sensor configured to generate a video signal based on a targeted view of an environment;
   a plurality of sensors configured to determine status information of said apparatus at a time of generation of said video signal; and
   a processor configured to (i) detect one or more objects in said video signal, (ii) determine absolute coordinates of said one or more objects in said video signal and (iii) generate metadata, wherein (A) said absolute coordinates of said one or more objects are based on (i) said status information, (ii) a relative location of said detected objects in said video signal and (iii) an orientation of said apparatus, and (iv) a field of view of said sensor, (B) said metadata corresponds to said absolute coordinates of said one or more objects and (C) said orientation of said apparatus is added to the relative location of the detected objects to determine said absolute coordinates.

19. The apparatus according to claim 18, wherein (i) a first of said plurality of sensors comprises a Global Positioning System (GPS) sensor configured to determine absolute coordinates of said apparatus and (ii) a second of said plurality of sensors comprises a magnetometer configured to determine an azimuth orientation of said apparatus.

20. An apparatus comprising:
- a sensor configured to generate a video signal based on a targeted view of an environment;
- an interface configured to receive status information of said apparatus at a time of generation of said video signal; and
- a connection to an external processor, said external processor configured to (i) detect one or more objects in said video signal, (ii) determine absolute coordinates of said one or more objects in said video signal and (iii) generate metadata, wherein (A) said absolute coordinates of said one or more objects are based on (i) said status information, (ii) a relative location of said detected objects in said video signal, (iii) an orientation of said apparatus and (iv) a field of view of said sensor, (B) said metadata corresponds to said absolute coordinates of said one or more objects and (C) said orientation of said apparatus is added to the relative location of the detected objects to determine said absolute coordinates.

* * * * *